United States Patent
Miyahara

(10) Patent No.: US 6,686,962 B1
(45) Date of Patent: Feb. 3, 2004

(54) IMAGING APPARATUS THAT READS OUT AN ELECTRICAL CHARGE FROM A PART OF ITS PLURALITY OF PHOTOELECTRICAL CONVERSION ELEMENTS

(75) Inventor: Hiroyuki Miyahara, Kanagawa-ken (JP)

(73) Assignee: Victor Company of Japan, Limited, Yokohama (JP)

( * ) Notice: Subject to any disclaimer, the term of this patent is extended or adjusted under 35 U.S.C. 154(b) by 0 days.

(21) Appl. No.: 09/401,246

(22) Filed: Sep. 23, 1999

(30) Foreign Application Priority Data

Sep. 28, 1998 (JP) .......................................... 10-273844

(51) Int. Cl.$^7$ .......................... H04N 3/14; H04N 5/335
(52) U.S. Cl. ...................... 348/311; 348/312; 348/314
(58) Field of Search ............................... 348/314, 311, 348/312, 317, 320, 321, 322, 323

(56) References Cited

U.S. PATENT DOCUMENTS

| | | | |
|---|---|---|---|
| 4,689,686 A | | 8/1987 | Hashimoto |
| 4,783,702 A | * | 11/1988 | Sone .......................... 358/213 |
| 4,985,776 A | * | 1/1991 | Taniji ......................... 358/213 |
| 5,181,118 A | * | 1/1993 | Kimura ....................... 358/213 |
| 5,278,657 A | * | 1/1994 | Tamura ....................... 358/209 |
| 5,438,365 A | * | 8/1995 | Yamashita .................. 348/312 |
| 6,005,612 A | * | 12/1999 | Kikuchi et al. ........... 348/222.1 |
| 6,185,270 B1 | * | 2/2001 | Kawamura ................... 377/61 |
| 6,342,922 B1 | * | 1/2002 | Mizoguchi .................. 348/355 |
| 6,400,404 B2 | * | 6/2002 | Hirota ........................ 348/314 |
| 6,452,634 B1 | * | 9/2002 | Ishigami et al. ............. 348/322 |
| 6,459,849 B1 | * | 10/2002 | Hasegawa .................... 386/109 |
| 6,519,000 B1 | * | 2/2003 | Udagawa ................... 348/220.1 |
| 6,529,236 B1 | * | 3/2003 | Watanabe ................. 348/230.1 |
| 2002/0057349 A1 | * | 5/2002 | Yamaguchi .................. 348/312 |

FOREIGN PATENT DOCUMENTS

| | | |
|---|---|---|
| EP | 0 251 790 | 1/1988 |
| EP | 0 282 993 | 9/1988 |
| EP | 0 796 008 | 9/1997 |
| JP | 06-141243 | 5/1994 |
| JP | 08-163417 | 6/1996 |
| JP | 09-149308 | 6/1997 |
| JP | 09-200605 | 7/1997 |
| JP | 10-210367 | 8/1998 |

* cited by examiner

*Primary Examiner*—Wendy R. Garber
*Assistant Examiner*—Justin Misleh
(74) *Attorney, Agent, or Firm*—Nath & Associates PLLC; Marvin C. Berkowitz

(57) ABSTRACT

A video camera apparatus has a plurality of photoelectric conversion elements, which convert input light to electrical charges, these being disposed in a matrix arrangement, and a drain section which drains off the electrical charges from a series of the photoelectric conversion elements arranged in a horizontal row. Each of the plurality of photoelectric conversion elements detects one of a prescribed plurality of colors, the plurality of photoelectric conversion elements being divided into a plurality of fixed patterns that are repeated with respect to the detected colors in the vertical direction. By draining off the electrical charges that are stored in photoelectric conversion elements of the plurality of photoelectric conversion elements other than photoelectric conversion elements within a prescribed area, the electrical charges stored in photoelectric conversion elements within the prescribed area are read out a plurality of times during one field period. The prescribed area is defined in units that are fixed patterns.

3 Claims, 5 Drawing Sheets

IMAGING APPARATUS THAT READS OUT AN ELECTRICAL CHARGE FROM A PART OF ITS PLURALITY OF PHOTOELECTRICAL CONVERSION ELEMENTS

BACKGROUND ART OF THE INVENTION

1. Field of the Invention

The present invention relates to an imaging apparatus such a CDD, a video camera, or other camera that makes use of solid-state imaging elements.

2. Description of the Related Art

In current video cameras, a solid-state imaging section (CCD image sensor) that is formed by a plurality of solid-state imaging elements, is used as an imaging means that is smaller and lighter than an imaging tube and which can be produced at a low cost. The construction of a general type of CCD image sensor is shown in FIG. 1.

FIG. 1 shows a CCD image sensor 50 that has a plurality of photoelectric conversion elements 51, which are formed by a plurality of elements that receive light of differing color and store this light as electrical charges, these being arranged in the vertical direction, a plurality of vertical transmission paths 52, which transmit the electrical charges that are stored by the photoelectrical conversion elements 51 in the vertical direction, and a horizontal transmission path 53, which transmits a charge in the horizontal direction that is transmitted by the plurality of vertical transmission paths 52.

In a CCD image sensor 50 such as noted above, the photoelectric conversion elements 51 and the vertical transmission paths 52 are arranged in alternating manner in two dimensions, the electrical charge that is stored by each photoelectric conversion element 51 being output via the vertical transmission paths 52 and the horizontal transmission path 53 each field period.

In the above-noted type of CCD image sensor 50, however, in order to improve the dynamic image resolution, a high-speed imaging method has been developed, whereby the electrical charge that is stored by each of the photoelectric conversion elements 51 is read out a plurality of times during a given field period, thereby forming a plurality of screen images.

However, to achieve high-speed signal imaging in a CCD image sensor having the above-noted configuration, there was an accompanying problem of the need to make the transmission frequency of the vertical transmission paths 52 and the horizontal transmission paths 53 high.

Specifically, to form a plurality of screen image with the field period not extended, but rather left as the same length as in the past, it is necessary to make a commensurate increase in the transmission speed and the signal processing speed. As a result, a decrease in the efficiency of transmission, and the difficulty of achieving correlated double sampling (CDS) and automatic gain control (AGC) at high frequency lead to a deterioration of the signal processing, and another means must be provided to avoid this problem.

SUMMARY OF THE INVENTION

The present invention was made in consideration of the above-noted problems with the related art, and has as an object the provision of an imaging apparatus that achieves high-speed imaging, without a major change to an imaging device of the past, such as a CCD.

To achieve the above-noted object, there is provided an imaging apparatus that has: a solid-state imaging section, which is formed by a plurality of photoelectric conversion element, which convert input light to an electrical charge, these photoelectric conversion elements being disposed in a matrix arrangement, and a controller, which performs control so as to read out the electrical charge that is stored in the photoelectric conversion elements over a prescribed area of the above-noted plurality of photoelectric conversion elements a plurality of times during one field period.

A preferred embodiment of the present invention further has a drain section, which drains off, at one time, the electrical charges that have been stored by a series of photoelectric conversion elements arranged in the horizontal direction, wherein the controller performs control so that the electrical charges that are stored by photoelectric conversion elements other than the photoelectric conversion elements of the prescribed area are all drained off at one time by the drain section, so that the electrical charges that are stored by the photoelectric conversion elements of the prescribed area are read out a plurality of times during one field period.

In an imaging apparatus according to the present invention as noted above, with regard to the prescribe area (to be referred to as the normal transmission area with regard to the embodiments to be described), the electrical charges that are stored by the photoelectric conversion elements are read out in a manner similar to the case of an imaging apparatus of the past, processing being passed on and an image being formed without draining off these charges. On the other hand, with regard to area (to be referred to as the high-speed transmission area with regard to the embodiments to be described) other than the prescribed area, the electrical charges that are stored by the photoelectric conversion elements are drained off or are not read out thereby increasing the processing speed. As a result, according to an imaging apparatus of the present invention, it is possible to achieve an improvement in dynamic image resolution of the acquired image, without extending the overall image processing time.

In a preferred embodiment of the present invention, each of the plurality of photoelectric conversion elements detects one of a plurality of prescribed colors, these plurality of photoelectric conversion elements being driven by a plurality of fixed patterns repeatedly in the vertical direction, the above-noted prescribed area being defined by units of the above-noted fixed pattern.

In the present invention, because the normal transmission area starts with the first photoelectric conversion element within one fixed pattern, there is no change in the imaging signal pattern that accompanies a change in the size of the normal transmission area, so that continuous image processing is possible even after a change in the size of the normal transmission area.

In a preferred embodiment of the present invention, the solid-state imaging section includes a photoelectric conversion element that is optically blocked, for the purpose of detecting a vertical black reference, the readout controller performing control so that each time an electrical charge that is stored by a photoelectric conversion element in the prescribed area, the charge stored in the photoelectric conversion element for the purpose of detecting the vertical black reference is read out.

In this manner, during one field period, by performing readout of the electrical charge a plurality of times, and also by reading the optical black reference (referred to hereinafter as VOB) a plurality of times during one field period, it is possible to accurately adjust the black reference for each image. In this case, when reading out an electrical charge a plurality of times during one field period, if the VOB is read out before the electrical charge is read out, it is possible to use this VOB data in, for example, smear detection.

The nature, principle and utility of the invention will become more apparent from the following detailed description when read in conjunction with the accompanying drawings.

DETAILED DESCRIPTION OF THE PREFERRED EMBODIMENTS

Embodiments of an imaging apparatus according to the present invention are described in detail below, with reference to relevant accompanying draw. The imaging apparatus according to the present invention can be applied to a video camera.

Figure 1:
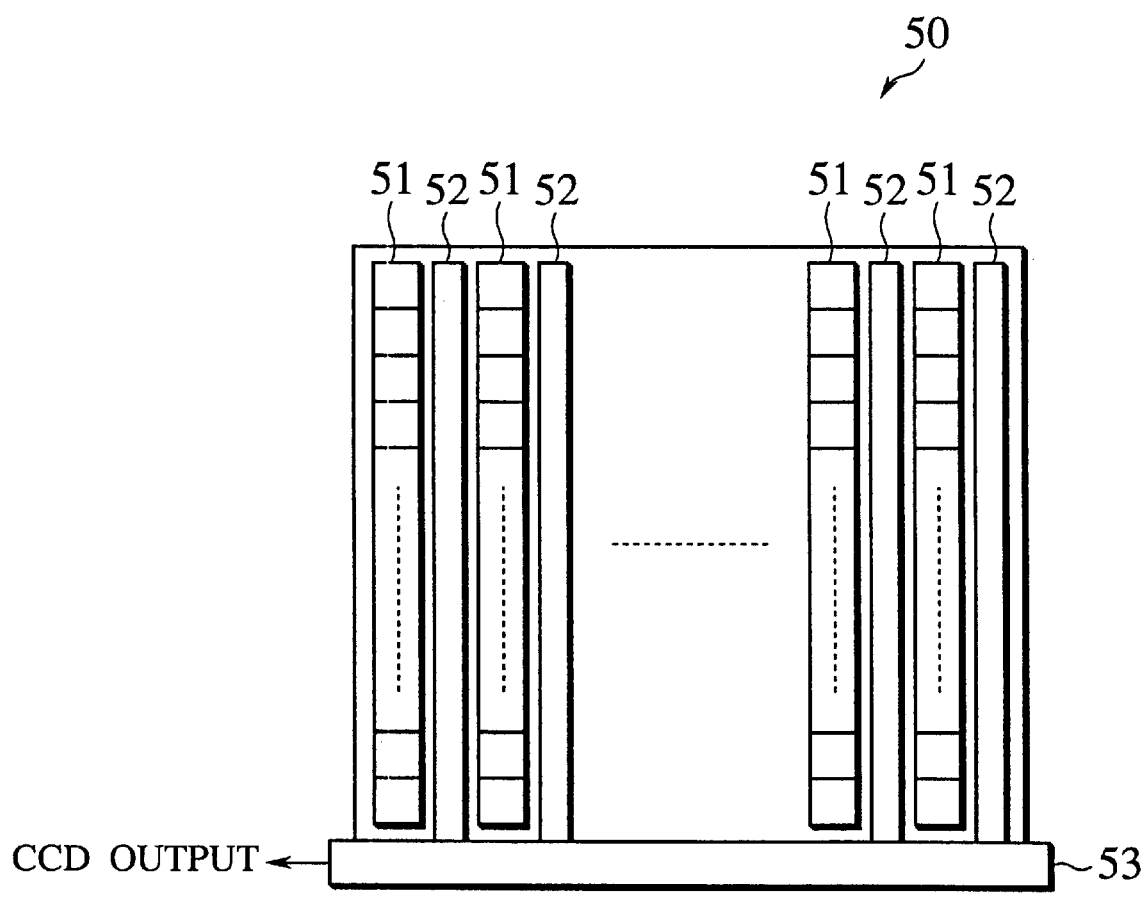
FIG. 1 is a drawing that shows the configuration of a CCD image sensor provided in a video camera of the past.
Figure 2:
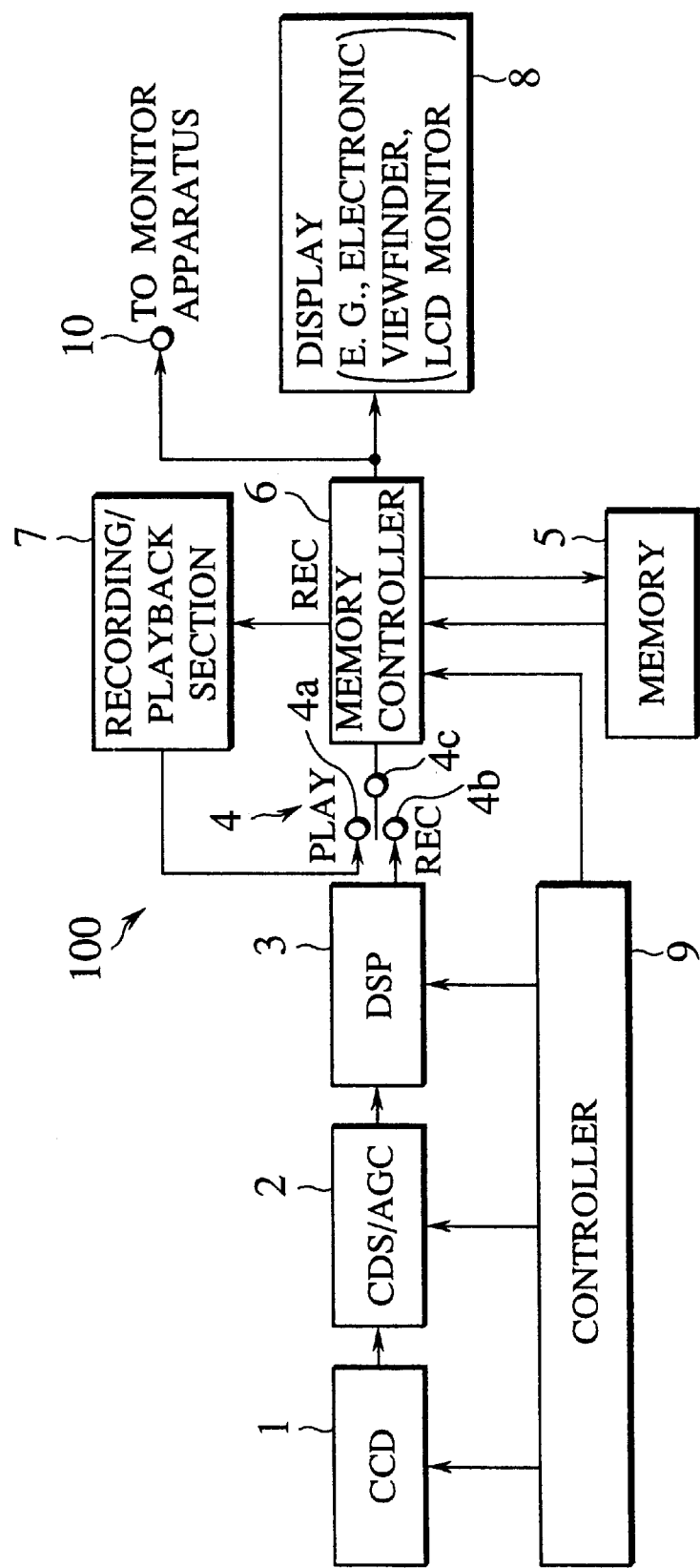
FIG. 2 is a block diagram that shows the overall configuration of an embodiment of a video camera to which is applied an imaging apparatus according to the present invention.

A video camera 100 according to an embodiment of the present invention, as shown in FIG. 2, has a CCD image sensor 1, which perform imaging of a subject, a correlated double sampling/automatic gain control controller (CDS/AGC) 2, which eliminates noise components from the signal from the CCD image sensor 1 by performing correlated double sampling, and which also performs amplifies the video signal, from which noise has been removed, with an appropriate gain, and outputs the amplified video signal, and a digital signal processor (DSP) 3, which performs prescribed video processing on the video signal from the CDS/AGC controller 2 and outputs the resulting signal.

Additionally, as shown in FIG. 2, this video camera 100 has a memory 5, into which is temporarily stored a video signal from the DSP 3, a recording/playback section 7, which records a video signal from the DSP 3 onto a video tape or plays back the signal, a selection switch 4, which when recording selectively outputs a video signal from the DSP 3 and which when playing back selectively outputs a video signal that is played back by the recording/playback section 7, and a memory controller 6, which performs storage and readout control of the memory 5.

This video camera 100 additionally has a display 8, which displays an image in response to a video signal that is supplied from the DSP 3 or an image that is played back by the recording/playback section 7, this being, for example, an electronic viewfinder or compact LCD monitor, an external output terminal 10 for the purpose of supplying a video signal to an external monitor apparatus, such as a TV receiver, and a controller 9, which performs control of the drive of the CCD image sensor 1, the CDS/AGC controller 2, the DSP 3, and the memory controller 6.

Figure 3:
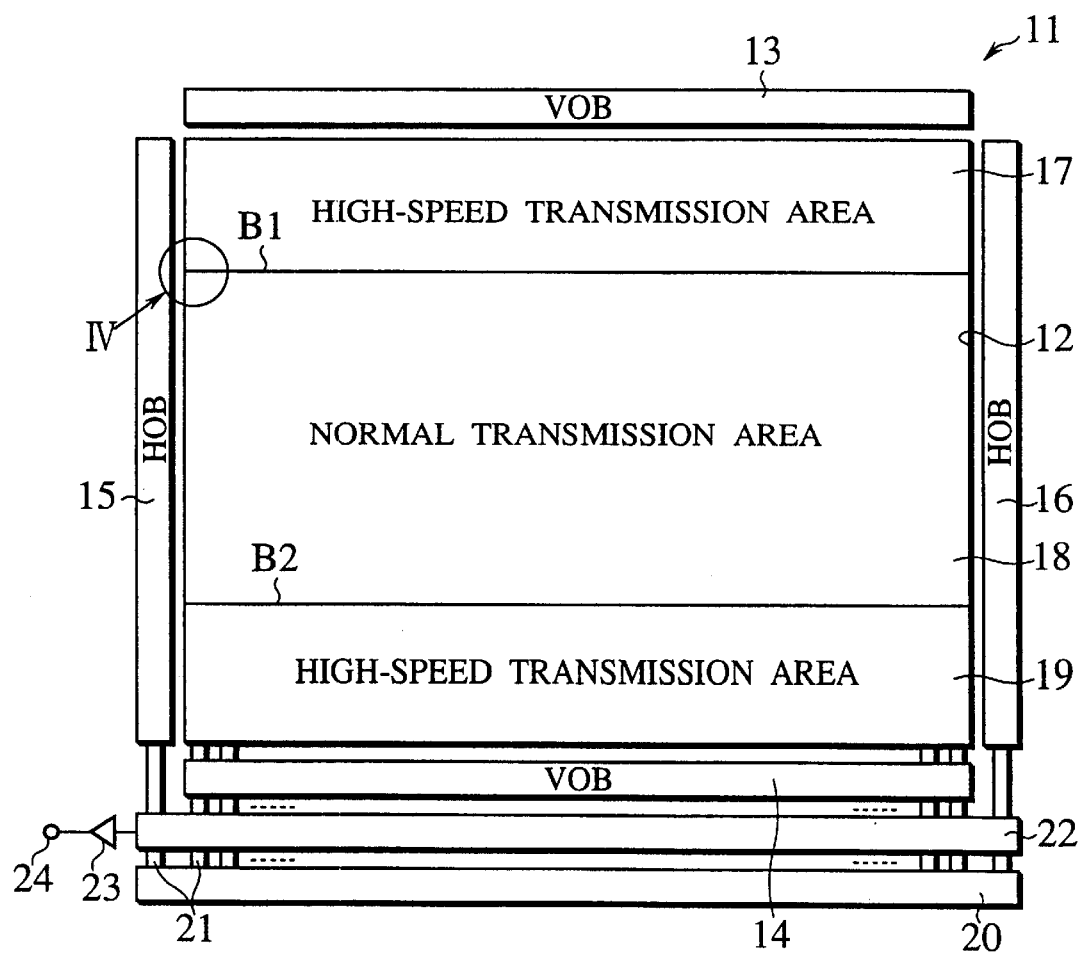
FIG. 3 is a drawing that shows the configuration of a CCD image sensor that is provided in a video camera according to the embodiment of FIG. 2.

The CCD image sensor 1, as shown in FIG. 3, is formed by a solid-state imaging section 11 made up of a large number of photoelectric conversion elements disposed in a matrix, and a drain section 20 for the purpose of draining off the electrical charges read out from the photoelectric conversion elements. The solid-state imaging section 11 outputs electrical charges that are stored by each photoelectric conversion element in response to received light.

Specifically, at the solid-state imaging section 11 of the above-noted CCD image sensor 1, the vertical transmission paths 21 and a row of photoelectric conversion elements are disposed in two-dimensional alternation. A charge that is stored by a photoelectric conversion element is vertically transmitted to the horizontal transmission path 22, via each vertical transmission path 21, after which it is horizontally transmitted on the horizontal transmission path 22, which supplies it to the amplifier 23, and the output terminal 24, and finally to the CDS/AGC controller 2.

The above-noted solid-state imaging section 11 has an effective image area 12, which is the area that is to receive light to form an optical image and additionally has, disposed around the periphery of this effective image area 12, optical black reference detection elements VOB 13 and 14 and HOB 15 and 16, which are made by shading photoelectric conversion elements by means of, for example, aluminum.

The VOB 13 and 14 are disposed in a horizontal arrangement at the uppermost and lowermost rows of the solid-state imaging section 11 and made by shading photoelectric conversion elements, and are used to detect the black reference in the vertical direction in the effective image area 12. The HOB 15 and 16 are disposed in a vertical arrangement at the left and right of the solid-state imaging section 11 and made by shading photoelectric conversion elements, these detecting the black reference in the horizontal direction in the effective image area 12.

In the video camera 100 according to an embodiment of the present invention in particular, there are provided a normal imaging mode and a high-speed imaging mode. When recording, the controller 9, depending upon the imaging mode, changing the method by which the electrical charges are read out in the solid-state imaging section 11 of the CCD image sensor 1.

More specifically, if the normal imaging mode is selected, the controller 9, similar to the case of a video camera of the past, performs control so that the electrical charges that are stored by the photoelectric conversion elements in the solid-state imaging section 11 are read out one time for each field period. One frame image is formed by the data that is read out at one time. When the high-speed imaging mode is selected, however, the controller 9 performs control so that the electrical charges that are stored by the photoelectric conversion elements in the solid-state imaging section 11 are read out a plurality of times during one field, and further so that part of the resulting data is drained off by the drain section 20. This high-speed imaging mode is described in detail below.

First, when the high-speed imaging mode is selected, the effective image area 12 is divide into a high-speed transmission area 17 and a normal transmission area 18 by changing with respect to the circuit thereof, by means of a TG (not shown in the drawing) that is provided in the controller 9, the way how to read electric charges in the solid-state imaging section 11.

That is, the effective image area 12 in this embodiment has two virtual boundaries B1 and B2 formed in it by making a change in the method of reading out the electrical charges from the photoelectric conversion elements during one field, these boundaries defining three areas: an upper section, a center section, and a lower section, these being the high-speed transmission area 17, the normal transmission area 18, and the high-speed transmission area 19.

More specifically, in the high-speed transmission areas 17 and 19, by draining off readout electrical charges and omitting the horizontal transmission, for example, that is normally performed thereafter, imaging is performed so as to achieve high speed. In the normal transmission area 18, however, an image is formed by having data passed to subsequent processing, without performing drain off of the readout electrical charges. In this case, each time readout is performed a plurality of times, a readout is performed of the electrical charge from at least one of the VOB 13 and 14, and detection of the vertical black reference is performed for each such readout.

Figure 4:
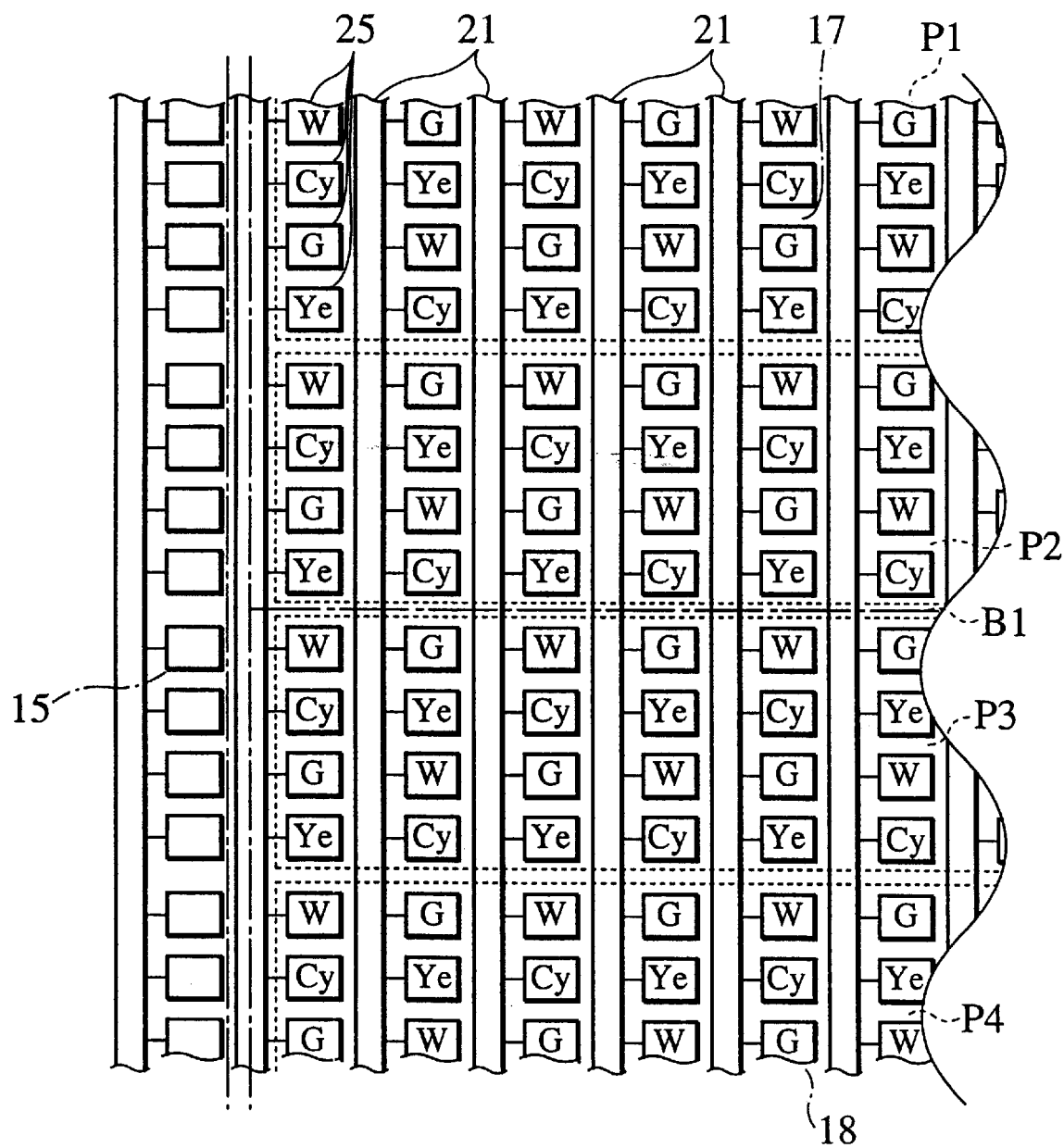
FIG. 4 is a drawing that shows the configuration of a CCD image sensor that is provided in a video camera according to an embodiment of the present invention, wherein the part IV of FIG. 3 is shown enlarged.

FIG. 4 shows an enlarged view of part IV that is shown in FIG. 3. As shown in FIG. 4, in the solid-state imaging section 11 the vertical transmission paths 21 and the photoelectric conversion elements 25 are arranged in two-dimensional alternating fashion. These photoelectric conversion elements 25 are connected to readout control terminals (not shown in the drawing), to which a readout control signal is supplied, the readout control terminals being supplied with the readout control signal so that readout to each of the vertical transmission paths 21 is made alternately between the photoelectric conversion elements 25 of odd-numbered lines and the photoelectric conversion elements 25 of even-numbered lines.

Each of the photoelectric conversion elements 25 is provided with a filter that is selected from a plurality of different filters, whereby each photoelectric conversion element 25 detects a light according to the filter with which it is provided. Specifically, in this embodiment of the present invention, each photoelectric conversion element 25 is provided with one filter that is selected from a set of filters consisting of white (W), green (G), cyan (Cy), and yellow (Y), so that light of corresponding colors are input thereto.

These various photoelectric conversion elements 25 are arranged in fixed unit patterns (shown in the drawing by broken lines) P1, P2, P3, P4, . . . , Pn, these unit patterns P1, P2, P3, P4, . . . , Pn being repeated in the vertical direction. More specifically, the unit patterns P1, P2, P3, P4, . . . , Pn in this embodiment are grouped into groups of 4 levels, forming a filter pattern in which the first level is white (W) and green (G), a filter array in which the second level is cyan (Cy) and yellow (Y), a white (W) and green (G) filter array in which the third level and first level sequence is reversed, and a cyan (Cy) and yellow (Y) filter array in which the third level and first level sequence is reversed.

The above is merely one example of color filter arrays, and it is also possible to provide a color filter array of a sequence of complimentary colors in Mg-G sequence, or a color filter array of RGB arrangement, known as primary colors-a Bayer sequence.

The above-described normal transmission area starts with the first photoelectric conversion element of a unit pattern. That is, the boundary B1 (shown in the drawing by a dot-dash line) between the normal transmission area 18 and the high-speed transmission area 17 is arranged so as to fall between the unit patterns P2 and P3 which are above and below the boundary, the normal transmission area 18 starting at the first level of the unit pattern P2.

The positions of the boundary lines B1 and B2 so as to establish the amount of time required for a multiple readout in the normal transmission area 18 during one field period, thereby adjusting the size of the high-speed transmission areas 17 and 19. That is, by adjusting the positions of the boundary lines B1 and B2, the lengthening of the processing time, which is extended by performing multiple readouts is cancelled out by the shortening of the processing time in the high-speed transmission area, so that the overall time for one field is maintained the same as in the past.

The boundary lines B1 and B2 can be established at arbitrary positions, as long as the positions are at the boundaries of unit patterns and, if necessary, these can be moved in the vertical direction for each field or each frame. Additionally, the establishment of the positions of the boundary lines B1 and B2 can be left up to the user, or performed automatically by the apparatus, in accordance with the imaging mode, by detecting or calculating the amount of processing time required for normal imaging and for high-speed imaging.

Figure 5:
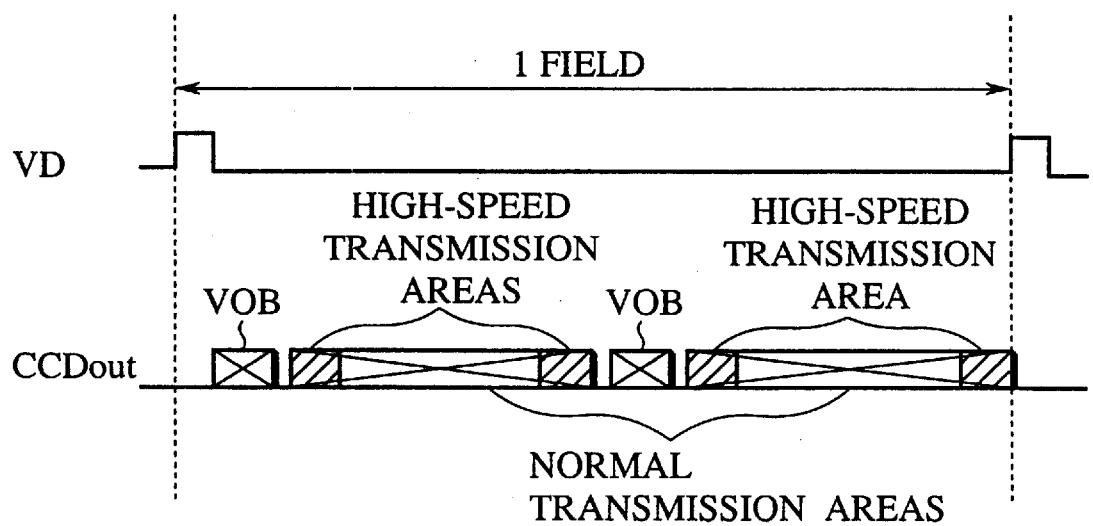
FIG. 5 is a timing diagram that shows the operation of a video camera according to an embodiment of the present invention, when imaging is performed.

The operation of video camera according to an embodiment having the above-noted configuration is described below. This video camera performs readout of the electrical charges from each photoelectric conversion element twice in each field period. FIG. 5 is a timing diagram that illustrates the sync signal and its relationship to the CCD output.

In FIG. 5, the sync signal (VD) period is a one-field period, during which in this embodiment the electrical charge from the photoelectric conversion elements are read twice. As shown by the CCDout in this drawing, each time the readout is performed two times, the vertical black reference VOB is read out and, when the electrical charge of a photoelectric conversion element that is part of the effective image area 12 is read out, high-speed transmission is performed for the area indicated by the hashed area in the drawing, with normal transmission performed for other areas.

According to a video camera 100 according to an embodiment of the present invention, by draining off the electrical charge in a high-speed transmission area so as to increase the processing speed, it is possible to improve the dynamic image resolution of an acquired image, without extending the overall imaging processing time. Additionally, by merely changing the CCD drive circuit in a video camera of the type used in the past, the present invention, the effect of the present invention can be achieved, thereby enabling effective use of existing parts and manufacturing facilities.

In a video camera 100 according to an embodiment of the present invention, because the boundary line B1 between the high-speed transmission area 17 and the normal transmission area 18 starts from the first photoelectric conversion element of a unit pattern, it is possible to perform continuous imaging processing, even before and after movement of the boundary line, without an accompanying pattern change in the video signal.

Additionally, in the video camera 100, because a multiple electrical charge readout is performed within one field period, and the VOB readout operation is performed multiple times during one field period, it is possible to accurately adjust the black reference for each image. When performing electrical charge readout multiple times during one field period, as is done in this embodiment of the present invention, by first reading out the VOB, it is possible to make effective use of the VOB data in, for example, smear detection.

Although in this embodiment of the present invention, the electrical charges from the high-speed transmission areas 17 and 19 are drained off via the drain section 20, the present invention is not restricted in this manner. For example, it is possible with the present invention to achieve high-speed imaging by not reading out the charge from photoelectric conversion elements that belong to the high-speed transmission area 17.

In conclusion, according to the imaging apparatus of the present invention, by performing high-speed transmission over a prescribed area of the effective image area, it is possible to prevent a deterioration of the image that would normally accompany multiple readouts of the video signal during one field period. In particular in the present invention, because it is possible to achieve this effect by merely changing the CCD drive circuit of an imaging apparatus of the past, it is possible to perform high-quality high-speed imaging, while making effective usage of existing technologies.

It should be understood that many modifications and adaptations of the invention will become apparent to those skilled in the art and it is intended to encompass such obvious modifications and changes in the scope of the claims appended hereto.

What is claimed is:

1. An imaging apparatus comprising:

a solid-state imaging section having a plurality of photoelectric conversion elements that convert input light to electrical charges, these photoelectric conversion elements being disposed in a matrix arrangement;

an electric charge transfer section which transfers the electric charges read out from the photoelectric conversion elements of the solid-state imaging section;

a drain section which drains off a part of the electric charges transferred by the electric charge transfer section;

a controller which controls the reading-out of the electric charges at the solid-state imaging section, the transfer of the electric charges at the electric charge transfer section, and the drain-off of the electric charges at the drain section; and a signal processor which performs a predetermined signal processing necessary for displaying on a screen, on electric charges that have been transferred by the electric charge transfer section but not drained off by the drain section, and outputs the processed electric charges as imaging signals, wherein the solid-state imaging section is provided with a first transmission area necessary for obtaining imaging signals corresponding to one screen and a second transmission area having the same horizontal length as the first transmission area and a vertical length that is one for an integer (not less than 2) of that of the first transmission area; and the controller, at a time of normal imaging, controls the solid-state imaging section, the electric charge transfer section, and the drain section so as to read out the electric charges from the photoelectric conversion elements in the first transmission area once during one field period and transfer the read-out electric charges without being drained off by the drain section, and at a time of high-speed imaging, controls the solid-state imaging section, the electric charge transfer section, and the drain section so as to read out the electric charges from the photoelectric conversion elements in the first transmission area plural times during one field period and transfer only electric charges read out from the photoelectric conversion elements in the second transmission area of all the read-out electric charges without being drained off by the drain section.

2. An imaging apparatus according to claim 1 wherein the solid-state imaging section includes plural types of photoelectric conversion elements corresponding to different colors of light, arranged to form a pattern in a vertical direction, and includes the second transmission area, a boundary thereof coinciding with a boundary of a repetition of the pattern.

3. An imaging apparatus according to claim 2 wherein the solid-state imaging section includes black reference photoelectric conversion elements being shielded not to accept light and generating a black reference signal in a vertical direction, and the controller controls the solid-state imaging section, the electric charge transfer section, and the drain section so as to read out the black reference signal from the black reference photoelectric conversion elements plural times during one field period and transfer the read-out black reference signal without being drained off by the drain section.

* * * * *